United States Patent
Pfaff et al.

(10) Patent No.: US 6,747,073 B1
(45) Date of Patent: *Jun. 8, 2004

(54) MULTILAYER PEARL LUSTRE PIGMENT

(75) Inventors: Gerhrad Pfaff, Munster (DE); Stephanie Andes, Hanau (DE); Gerald Fuchs-Pohl, Weiterstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/889,427

(22) PCT Filed: Jan. 7, 2000

(86) PCT No.: PCT/EP00/00069

§ 371 (c)(1),
(2), (4) Date: Jul. 18, 2001

(87) PCT Pub. No.: WO00/43456

PCT Pub. Date: Jul. 27, 2000

(30) Foreign Application Priority Data

Jan. 19, 1999 (DE) .......................... 199 01 612

(51) Int. Cl.$^7$ .............. C09D 5/29; C09C 1/62; B32B 15/04
(52) U.S. Cl. .............. 523/171; 524/401; 524/492; 106/403; 106/436; 106/450; 106/456; 428/403
(58) Field of Search .......................... 523/171; 524/401, 524/492; 106/403, 436, 450, 456; 428/403

(56) References Cited

U.S. PATENT DOCUMENTS

| 4,434,010 | A | * | 2/1984 | Ash |
| 5,607,504 | A | * | 3/1997 | Schmid et al. |
| 5,958,125 | A | * | 9/1999 | Schmid et al. |
| 6,280,520 | B1 | * | 8/2001 | Andes et al. |

FOREIGN PATENT DOCUMENTS

| DE | 19802234 | 7/1998 |
| EP | 0753545 | 1/1997 |

* cited by examiner

*Primary Examiner*—Tae H. Yoon
(74) *Attorney, Agent, or Firm*—Millen, White, Zelano, Branigan, P.C.

(57) ABSTRACT

Multilayer pearl luster pigment on the basis of a platelet-shaped substrate comprising a material having a refractive index of more than 1.8, which comprises at least (i) a first layer of a material of low refractive index in the range from 1.35 to 1.8,
(ii) optionally, a second layer of a material having a refractive index of more than 1.8.
(iii) a semitransparent metal layer which is applied to the substrate or to the layers (i) or (ii) and
(iv) if desired, an aftercoating, the substrate being platelet-shaped titanium dioxide, zirconium dioxide, α-iron(III) oxide, tin dioxide or zinc oxide.

14 Claims, No Drawings

MULTILAYER PEARL LUSTRE PIGMENT

The invention relates to a multilayer pearl lustre pigment having a pronounced colour flop, based on a platelet-shaped substrate comprising a material having a refractive index of more than 1.8.

Multilayer pigments which exhibit an angle-dependent colour change between two or more intensive interference colours are known.

For instance, U.S. Pat. No. 4,434,010 describes a multilayer interference pigment consisting of a central layer of a reflective material (aluminium), and alternating layers of two transparent, dielectric materials of high and low refractive index, for example titanium dioxide and silicon dioxide, on either side of the central aluminium layer. In a further embodiment of the pigment, the layers following the central aluminium layer are formed by magnesium fluoride and chromium. This pigment exhibits an intensive colour flop from green to purplish red.

EP 0 753 545 describes goniochromatic lustre pigments based on transparent, non-metallic, platelet-shaped substrates, which have at least one layer stack comprising a colourless coating with a refractive index $n \leq 1.8$ and a reflective, selectively or non-selectively absorbing coating which is at least partly transparent to visible light, and which also have, if desired, an external protective layer in addition.

These pigments have the disadvantage that they are produced by a technically very complex and costly process, for example by chemical vapour deposition (CVD) or physical vapour deposition (PVD) techniques. Further disadvantages are the frequent difficulty in reproducing the pigments in the desired product quality, and their deficient weathering stability.

It is the object of the present invention to provide an essentially transparent interference pigment having strong interference colours and/or a high angular dependency of the interference colours and featuring advantageous applications properties, which at the same time is simple to produce.

This object is achieved in accordance with the invention by a multilayer pearl lustre pigment on the basis of a platelet-shaped substrate comprising a material having a refractive index of more than 1.8, which comprises at least (i) a first layer of a material of low refractive index in the range from 1.35 to 1.8,
(ii) optionally, a second layer of a material having a refractive index of more than 1.8,
(iii) a semitransparent metal layer which is applied to the substrate or to the layers (i) or (ii), and
(iv) if desired, an aftercoating.

If the semitransparent metal layer forms the outer layer of the pigment, it is also possible for layers of high and low refractive index to follow. Before the metal layer is applied, the first and second layers may also be repeated.

This object is further achieved, in accordance with the invention, by a process for producing the pigment of the invention by applying a precursor of the substrate material as a thin film to a continuous belt,
solidifying the liquid film by drying and, in so doing, developing the metal oxide by chemical reaction from the precursor,
detaching the dried film,
washing the resultant substrate particles and resuspending them in a coating solution,
coating the substrate particles with two or more layers of metal oxides or metals, and
aftercoating the resultant pigment.

Alternatively, the layer system can be produced with the aid of a PVD technique or by a combination of wet-chemical techniques and/or CVD and/or PVD techniques.

The invention additionally provides for the use of the pigments of the invention in paints, varnishes, printing inks, plastics, ceramic materials, glasses and be cosmetic formulations. For these purposes they may also be employed as mixtures with commercially customary pigments, examples being organic and inorganic absorption pigments, metal-effect pigments and LCP pigments.

In addition to the purely colouristic applications, the pigments of the invention can also be considered for functional applications. Examples of these are as pigments for the security sector, e.g. the printing of items of value and of security, as pigments with specific IR reflection, e.g. for glasshouse films, and as pigments for the laser marking of plastics.

The pigments of the invention are based on platelet-shaped substrates having a refractive index of more than 1.8. These substrates may consist, for example, of titanium dioxide, zirconium dioxide, $\alpha$-iron(III) oxide, tin oxide, zinc oxide or other transparent and stable materials capable of taking on soluble or insoluble colorants.

Precursors employed for the production of the substrates are solutions of organic or inorganic compounds of the metals titanium, zirconium, iron, tin, zinc or mixtures thereof. A preferred precursor is titanium tetrachloride.

The platelet-shaped substrate particles have a thickness of between 0.05 and 5 $\mu$m and, in particular, between 0.05 and 2 $\mu$m. The extent in the other two dimensions is between 2 and 200 $\mu$m, and, in particular, between 5 and 50 $\mu$m.

Suitable layer material for the layer (i) having a refractive index of from 1.35 to 1.8 comprises all materials of low refractive index which are known to if the person skilled in the art and can be applied permanently and in film-like manner to the substrate particles. Particularly suitable are metal oxides or metal oxide mixtures, such as $SiO_2$, $Al_2O_3$, $AlO(OH)$, $B_2O_3$ or a mixture of the said metal oxides or $MgF_2$. Alternatively, the material of low refractive index employed can comprise polymers, so as acrylates. The monomers used have a molecular weight of from 200 to 1000 and are available as mono-, di- or triacrylates. In terms of functional groups, they are available as hydrocarbons, polyols, polyethers, silicones or fluorinated Teflon-like monomers. These monomers can be polymerized by electron beams or UV rays. The layers obtained possess a temperature stability of up to 250° C. The refractive indices of the acrylate layers lie within the range from 1.35 to 1.60. Further details can be found in David G. Shaw and Marc G. Langlois: Use of a new high speed acrylate deposition process to make novel multilayer structures, MRS Conference in San Francisco 1995; A new high speed process for vapour depositing fluoro and silicone acrylates for release coating applications, Conference of the Society of Vacuum Coaters in Chicago, Ill., 1995.

The thickness of the layer (i) is 10–1000 nm, preferably 20–800 nm and, in particular, 30–600 nm.

Suitable layer materials for the layer (ii) having a refractive index of more than 1.8 are preferably metal oxides or metal oxide mixtures, such as $TiO_2$, $Fe_2O_3$, $ZrO_2$, $ZnO$, $SnO_2$, or compounds of high refractive index such as iron titanates, iron oxide hydrates, titanium suboxides, chromium oxide, bismuth vanadate, cobalt aluminate, and also mixtures and/or mixed phases of the said compounds with one another or with other metal oxides. Metal sulphides, metal nitrides and metal oxynitrides are also suitable. The thickness of the layer (ii) is 10–550 nm, preferably 15–400 nm and, in particular, 20–350 nm.

The metal layers (iii) consist of metals, such as aluminium, chromium, nickel, chromium-nickel alloys or silver. Chromium and aluminium are preferred here, since they are easy to deposit. The layer thickness of the metal layers is set at from 5 to 20 nm in order to obtain semitransparency. Alternatively, materials such as graphite or titanium nitride can be employed as semitransparent reflector layers.

The pigments of the invention also include additional colorants in the coating. If, for example, particles of carbon black are used, then particle sizes of from 5 to 200 nm, and, in particular, from 10 to 100 nm are used. Pigments of this kind, which contain preferably carbon black particles in layers of titanium dioxide, iron oxide, tin oxide, chromium oxide and zinc oxide, are described in EP 0 499 864.

In addition, the pigments of the invention may also comprise particles of titanium dioxide, aluminium oxide, silicon dioxide, tin dioxide, magnesium oxide, zinc oxide, cerium dioxide, tungsten oxide, molybdenum oxide, zirconium oxide, or else mixed oxides, such as $Cr_2FeO_4$, $CoAl_2O_4$ or $NiAl_2O_4$, in the coating.

Instead of inorganic pigment particles it is also possible for organic pigment particles to be present in the coating, in which case particular preference is given to temperature-stable organic pigments. Organic pigment particles used are preferably phthalocyanines, products of laking basic dyes with heteropolyacids, and anthraquinones, phenazines, phenoxazines, diketopyrrolopyrroles or perylenes. In principle, all pigments which have been described for incorporation into the substrate can also be incorporated into the coating of the pigment of the invention. The incorporation of small particles of metal oxide or organic pigment having an average size of from 10 to 40 nm into the cavities of the metal oxide coating brings about a marked increase in the hiding power and in the lustre, in association with a high level of homogeneity of the coating in comparison to pigments obtained by coprecipitation. The hiding power and, in the case of coloured pigment particles, the observation-angle-dependent absorption colour of the pigments of the invention can be varied within a wide range by way of the concentration of the pigment particles incorporated. The mass fraction of incorporated pigment particles, based on the coating, lies between 0.5 and 30% and, in particular, between 2 and 20%. Further details of pigments which comprise pigment particles in the coating can be found in DE 41 40 295.

The finished pigment can be subjected to an aftercoating or aftertreatment (iv), which increases further the light stability, weathering stability and chemical stability, or which facilitates the handling of the pigment, especially its incorporation into various media. Suitable aftercoatings or aftertreatments are, for example, the processes described in DE-C 22 15 191, DE-A 31 51 354, DE-A 32 35 017 or DE-A 33 34 598.

The additionally applied substances account for only from about 0.1 to 5% by weight, preferably from about 0.5 to 3% by weight, of the overall pigment.

The number and thickness of the layers is dependent on the desired effect and on the substrate used. The number of layers is limited by the economics of the pigment. If the substrate used is $TiO_2$ platelets, which in accordance with the process described in WO 97/43346 are produced on a continuous belt, it is possible to obtain particularly well-defined interference effects, since these $TiO_2$ platelets possess a uniform layer thickness. The reflection spectrum or transmission spectrum of such a pigment features finer and more precisely harmonizable structures than the spectrum of a corresponding pigment which is based on a substrate having a broad thickness distribution, such as mica, to for example.

In accordance with WO 97/43346 the $TiO_2$ platelets are produced on a continuous belt by solidification and hydrolysis of a titanium tetrachloride solution.

The metal oxide layers are preferably applied by wet-chemical means, it being possible to employ the wet-chemical coating techniques developed for the production of pearl lustre pigments; such techniques are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or else in further patent documents and in other publications.

For coating, the substrate particles are suspended in water and the suspension is admixed with one or more hydrolysable metal salts at a pH suitable for the hydrolysis, this pH being chosen such that the metal oxides and/or metal oxide hydrates are deposited directly on the particles without instances of secondary precipitation. The pH is normally held constant by simultaneous metered addition of a base. Subsequently, the pigments are separated off, washed and dried and, if desired, calcined, it being possible to optimize the calcination temperature in respect of the particular coating present. If desired, the pigments can be separated off, dried and, if desired, calcined following the application of individual coatings, before then being resuspended in order to apply the further layers by precipitation.

In addition, coating can also be carried out by gas-phase coating in a fluidized-bed reactor, it being possible to employ, accordingly, the techniques proposed in EP 0 045 851 and EP 0 106 235 for the production of pearl lustre pigments.

For the application of titanium dioxide layers, preference is given to the technique described in U.S. Pat. No. 3,553, 001.

An aqueous titanium salt solution is added slowly to a suspension, heated to about 50–100° C., especially 70–80° C., of the material to be coated, and a substantially constant pH of about 0.5–5, in particular about 1.5–2.5, is maintained by simultaneous metered addition of a base, such as aqueous ammonia solution or aqueous alkali metal hydroxide solution, for example. As soon as the desired layer thickness of the $TiO_2$ precipitate is reached, the addition of the titanium salt solution and of the base is stopped.

This technique, which is also referred to as the titration technique, is notable for the fact that it avoids an excess of titanium salt. This is achieved by supplying to the hydrolysis per unit time only that quantity of titanium salt solution which is required for uniform coating with the hydrated $TiO_2$ and can be received per unit time by the available surface area. Consequently, no hydrated titanium dioxide particles are produced that are not precipitated on the surface to be coated.

For the application of the silicon dioxide layers, the following technique can be employed: a sodium waterglass solution is metered into a suspension, heated at about 5–100° C., especially 70–80° C., of the material to be coated. The pH is held constant at from 4 to 10, preferably from 6.5 to 8.5, by simultaneous addition of 10% hydrochloric acid. Following the addition of the waterglass solution, stirring is continued for 30 minutes.

The individual layers can also be produced in accordance with known techniques by sputtering metals, such as aluminium or chromium, or alloys, such as Cr—Ni alloys, and also metal oxides, for example titanium oxide, silicon oxide or indium-tin oxide, or by, thermal evaporation of metals, metal oxides or acrylates. Preference is given to a vacuum belt coating as described in DE 197 07 805 and in DE 197 07 806 for the production of interference pigments.

What is claimed:

1. A multilayer pearl luster pigment comprising a platelet-shaped substrate, which substrate comprises a material having a refractive index of more than 1.8, and, on the substrate, at least:
   (i) a first layer of a material of low refractive index in the range from 1.35 to 1.8,
   (ii) a second layer, coated on the first layer, of a material having a refractive index of more than 1.8, and
   (iii) a semitransparent metal layer, having a thickness of from 5 to 20 nm, either coated on the substrates, coated on layer (ii), or coated on the second layer of a repeated first and second layer coated on layer (ii), and
   (iv) optionally, an aftercoating.

2. A pearl luster pigment according to claim 1, wherein the substrate is platelet-shaped titanium dioxide, zirconium dioxide, α-iron (III) oxide, tin dioxide or zinc oxide.

3. A pearl luster pigment according to claim 1, wherein the material of low refractive index is $SiO_2$, $Al_2O_3$, $AlO(OH)$, $B_2O_3$, $MgF_2$ or an acrylate polymer.

4. A pearl luster pigment according to claim 1, wherein the second layer material having a refractive index of more than 1.8 is $TiO_2$, $ZrO_2$, $Fe_2O_3$, $SnO_2$, $ZnO$ or a mixture of these oxides or an iron titanate, an iron oxide hydrate, a titanium suboxide or a mixture and/or mixed phase of these compounds.

5. A method for pigmenting paints, printing inks, plastics cosmetics, glazes for ceramics, or glasses which comprises incorporating a pigment according to claim 1 therein.

6. A method for printing items of value or of security, which comprises incorporating a pigment according to claim 1 therein.

7. Paints, printing inks, plastics, cosmetics, ceramics, glasses and polymer films pigmented with a pigment according to claim 1.

8. Laser-markable plastics comprising pigments according to claim 1.

9. An agricultural film, which comprises a pigment according to claim 1.

10. A multilayer pearl luster pigment of claim 1, wherein the semitransparent metal layer is coated on the second layer, (ii).

11. A multilayer pearl luster pigment of claim 1, wherein the pigment further comprises, on the second layer (ii), an additional layer of a material of low refractive index in the range from 1.35 to 1.8 and thereon a layer of material having a refractive index of more than 1.8, and the semitransparent metal layer is on this last layer.

12. A multilayer pearl luster pigment of claim 1, wherein the platelet-shaped substrate are particles having a thickness between 0.05 and 5 μm and an extent in the other two dimensions of 2 to 200 μm, the first layer, (i), has a thickness of 10 to 1000 nm, and the second layer, (ii), has a thickness of 10 to 550 nm.

13. A multilayer pearl luster pigment of claim 1, wherein the platelet-shaped substrate are particles having a thickness between 0.05 and 2 μm and an extent in the other two dimensions of 5 to 50 μm, the first layer, (i), has a thickness of 20 to 800 nm, and the second layer, (ii), has a thickness of 15 to 400 nm.

14. A multilayer pearl luster pigment of claim 1, wherein the semitransparent metal layer is of aluminum, chromium, nickel, a chromium-nickel alloy, or silver.

* * * * *